(12) United States Patent
Abell et al.

(10) Patent No.: US 12,542,335 B2
(45) Date of Patent: Feb. 3, 2026

(54) BATTERY CELLS WITH ASYMMETRIC ELECTRODE TABS AND METHOD FOR MANUFACTURING

(71) Applicant: GM GLOBAL TECHNOLOGY OPERATIONS LLC, Detroit, MI (US)

(72) Inventors: Jeffrey A. Abell, Rochester Hills, MI (US); Wayne Cai, Troy, MI (US); Jennifer Therese Bracey, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 630 days.

(21) Appl. No.: 17/988,953

(22) Filed: Nov. 17, 2022

(65) Prior Publication Data
US 2024/0170810 A1 May 23, 2024

(51) Int. Cl.
*H01M 50/54* (2021.01)
*H01M 50/105* (2021.01)
(Continued)

(52) U.S. Cl.
CPC ......... *H01M 50/54* (2021.01); *H01M 50/105* (2021.01); *H01M 50/178* (2021.01);
(Continued)

(58) Field of Classification Search
CPC .. H01M 50/54; H01M 50/548; H01M 50/178; H01M 50/105; H01M 50/533;
(Continued)

(56) References Cited

U.S. PATENT DOCUMENTS

2007/0231684 A1* 10/2007 Takano ............... H01M 50/124
429/161
2014/0295237 A1* 10/2014 Kumar ............... H01M 50/186
429/104
(Continued)

FOREIGN PATENT DOCUMENTS

| CN | 203415648 U | 1/2014 | |
|---|---|---|---|
| CN | 111613837 A * | 9/2020 | .......... H01M 10/058 |
| EP | 2254186 A1 | 11/2010 | |

OTHER PUBLICATIONS

German Office Action from counterpart DE102023125974.1, dated Nov. 4, 2024.
U.S. Appl. No. 17/868,887, filed Jul. 20, 2022, Cai et al.

*Primary Examiner* — James M Erwin (57) ABSTRACT

A battery cell includes cathode electrodes including cathode electrode coatings arranged on cathode current collectors, and anode electrodes including anode electrode coatings arranged on anode current collectors. The cathode electrodes and the anode electrodes are arranged in a predetermined order in a stack. The cathode current collectors include first external tabs in a first asymmetric position and second external tabs in a second asymmetric position. The first external tabs and the second external tabs of the cathode electrodes are welded to a cathode lead tab. The anode current collectors include first external tabs in a first asymmetric position and second external tabs in a second asymmetric position. The first external tabs and the second external tabs of the anode electrodes are welded to an anode lead tab.

15 Claims, 6 Drawing Sheets

(51) Int. Cl.
*H01M 50/178* (2021.01)
*H01M 50/533* (2021.01)
*H01M 50/534* (2021.01)
*H01M 50/536* (2021.01)
*H01M 50/548* (2021.01)
*H01M 50/55* (2021.01)
*H01M 50/553* (2021.01)
*H01M 50/562* (2021.01)

(52) U.S. Cl.
CPC ....... *H01M 50/533* (2021.01); *H01M 50/534* (2021.01); *H01M 50/536* (2021.01); *H01M 50/548* (2021.01); *H01M 50/55* (2021.01); *H01M 50/553* (2021.01); *H01M 50/562* (2021.01)

(58) Field of Classification Search
CPC .. H01M 50/534; H01M 50/55; H01M 50/553; H01M 50/536; H01M 50/562
USPC .......................................................... 429/179
See application file for complete search history.

(56) References Cited

U.S. PATENT DOCUMENTS

2020/0235370 A1* 7/2020 Chen .................... H01M 10/052
2021/0184265 A1* 6/2021 Batson .............. H01M 10/0525

* cited by examiner

FIG. 8B

BATTERY CELLS WITH ASYMMETRIC ELECTRODE TABS AND METHOD FOR MANUFACTURING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to battery cells with asymmetric electrode tabs.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. Manufacturers of EVs are pursuing increased power density to increase the range of the EVs.

SUMMARY

A battery cell includes C cathode electrodes including cathode electrode coatings arranged on C cathode current collectors, and A anode electrodes including anode electrode coatings arranged on A anode current collectors, where A and C are integers greater than one. The C cathode electrodes and the A anode electrodes are arranged in a predetermined order in a stack. At least one of: C1 of the C cathode current collectors include first external tabs in a first asymmetric position and C2 of the C cathode current collectors include second external tabs in a second asymmetric position, where C1 and C2 are integers greater than one, and A1 of the A anode current collectors include first external tabs in a first asymmetric position and A2 of the A anode current collectors include second external tabs in a second asymmetric position, wherein A1 and A2 are integers greater than one. At least one of: the first external tabs of the C cathode current collectors are welded together, and the second external tabs of the C cathode current collectors are welded together, and the first external tabs of the A anode current collectors are welded together, and the second external tabs of the A anode current collectors are welded together.

In other features, a cathode lead tab welded to the first external tabs and the second external tabs of the C cathode current collectors; and an anode lead tab welded to the first external tabs and the second external tabs of the A anode current collectors. A pouch enclosure encloses the C cathode electrodes and the A anode electrodes, wherein the cathode lead tab and the anode lead tab extend through the pouch enclosure. At least one of: A1 is equal to A2; and C1 is equal to C2. At least one of: A1 is not equal to A2; and C1 is not equal to C2.

In other features, at least one of the cathode lead tab and the anode lead tab have one of rectangular cross sections and "T"-shaped cross sections. At least one of the cathode lead tab and the anode lead tab comprise mesh. The first external tabs and the second external tabs are arranged on one side of the C cathode electrodes. The first external tabs and the second external tabs of the A anode electrodes are arranged on one of an opposite side of the A anode electrodes, an adjacent side of the A anode electrodes, and on a same side of the A anode electrodes as the one side of the C cathode electrodes.

In other features, at least one of: the cathode lead tab, the first external tabs, and the second external tabs of the C cathode current collectors are welded together using a pre-weld and a main weld, and the anode lead tab, the first external tabs, and the second external tabs of the A anode current collectors are welded together using a pre-weld and a main weld.

In other features, at least one of: the cathode lead tab, the first external tabs, and the second external tabs of the C cathode current collectors are welded together without pre-welding, and the anode lead tab, the first external tabs, and the second external tabs of the A anode current collectors are welded together without pre-welding.

A method for manufacturing a battery cell includes providing C cathode electrodes including cathode electrode coatings arranged on C cathode current collectors; and providing A anode electrodes including anode electrode coatings arranged on A anode current collectors, where A and C are integers greater than one. The method includes at least one of defining first external tabs on C1 of the C cathode current collectors in a first asymmetric position and second external tabs on C2 of the C cathode current collectors in a second asymmetric position, where C1 and C2 are integers greater than one; and defining first external tabs on A1 of the A anode current collectors in a first asymmetric position and second external tabs on A2 of the A anode current collectors in a second asymmetric position, where A1 and A2 are integers greater than one. The method includes arranging the C cathode electrodes and the A anode electrodes in a predetermined order in a stack. The method includes at least one of welding the first external tabs of the C cathode current collectors together and the second external tabs of the C cathode current collectors together; and welding the first external tabs of the A anode current collectors together and the second external tabs of the A anode current collectors together.

In other features, the method includes welding a cathode lead tab to the first external tabs and the second external tabs of the C cathode current collectors. The method includes welding an anode lead tab to the first external tabs and the second external tabs of the A anode current collectors.

In other features, the method includes enclosing the C cathode electrodes and the A anode electrodes in a pouch enclosure with the cathode lead tab and the anode lead tab extending through the pouch enclosure. At least one of A1 is equal to A2; and C1 is equal to C2. At least one of A1 is not equal to A2; and C1 is not equal to C2.

In other features, at least one of the cathode lead tab and the anode lead tab has a cross section selected from a group consisting of a rectangular cross section and a "T"-shaped cross section. At least one of the cathode lead tab and the anode lead tab comprises mesh.

In other features, the method includes arranging and sequencing the first external tabs and the second external tabs on one side of the C cathode electrodes and the first external tabs and the second external tabs of the A anode electrodes on an opposite side of the A anode electrodes.

In other features, the method includes arranging and sequencing the first external tabs and the second external tabs on one side of the C cathode electrodes and the first external tabs and the second external tabs of the A anode electrodes on an adjacent side of the A anode electrodes.

In other features, the method includes arranging and sequencing the first external tabs and the second external tabs on one side of the C cathode electrodes and the first external tabs and the second external tabs of the A anode electrodes on a same side of the A anode electrodes.

In other features, at least one of the cathode lead tab, the first external tabs, and the second external tabs of the C cathode current collectors are welded together using a pre-weld and a main weld, and the anode lead tab, the first external tabs, and the second external tabs of the A anode current collectors are welded together using a pre-weld and a main weld.

In other features, at least one of the cathode lead tab and the first external tabs, and the second external tabs of the C cathode current collectors are welded together without pre-welding, and the anode lead tab and the first external tabs, and the second external tabs of the A anode current collectors are welded together without pre-welding.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the battery cells with anode electrodes and cathode electrodes with asymmetric electrode tabs are described herein in the context of EVs, the battery cells can be used in stationary applications and/or in other applications.

Some battery cells include a large number of cathode electrodes and anode electrodes (e.g., 60 or more for each). During manufacturing, all of the external tabs of the anode electrodes of a battery cell are pre-welded together and welded to an anode lead tab. Similarly, all of the external tabs of the cathode electrodes of the battery cell are pre-welded together and welded to a cathode lead tab.

In some examples, the cathode electrodes and anode electrodes are enclosed in a pouch enclosure with the anode lead tab and the cathode lead tab extending from the pouch enclosure. The anode lead tab and the cathode lead tab are connected to a busbar. For example, it can be difficult to weld 60 anode external tabs together and/or 60 cathode external tabs together with high reliability.

A battery cell with asymmetric electrode tabs includes A1 anode electrodes with first external tabs and A2 anode electrodes with second external tabs that are offset from each other along corresponding side surfaces of the A1 and A2 anode electrodes, where A1 and A2 are integers. The battery cell includes C1 cathode electrodes with first external tabs and C2 cathode electrodes with second external tabs that are offset from each other along a surface of the C1 and C2 cathode electrodes, where C1 and C2 are integers greater than one.

The first external tabs and the second external tabs of the A1 anode electrodes and the A2 anode electrodes, respectively, are pre-welded together separately. The first external tabs and the second external tabs of the C1 cathode electrodes and the C2 cathode electrodes, respectively, are pre-welded together separately.

The first external tabs and the second external tabs of the A1 anode electrodes and the A2 anode electrodes are welded to an anode lead tab. The first external tabs and the second external tabs of the C1 cathode electrodes and the C2 cathode electrodes are welded to a cathode lead tab. The cathode electrodes and anode electrodes are enclosed in a pouch enclosure with the anode lead tab and the cathode lead tab extending from the pouch enclosure. The anode lead tab and the cathode lead tab are connected to a busbar.

In some examples, the battery cell includes greater than or equal to 20, 30, 40, 50, 60 or more anode electrodes and 20, 30, 40, 50, 60 or more cathode electrodes, respectively. By reducing the number of external tabs that need to be welded together at the same time by one third or one half, the reliability of the welds increases. In some examples, each of the asymmetric external tabs of the cathodes include the same number of electrode tabs (e.g., C1=C2) and/or each of the asymmetric external tabs of the anodes include the same number of electrode tabs (e.g., A1=A2). In other examples, each of the asymmetric external tabs of the cathodes include a different number of electrode tabs (e.g., C1<>C2) and/or each of the asymmetric external tabs of the anodes include a different number of electrode tabs (e.g., A1<>A2).

Figure 1:
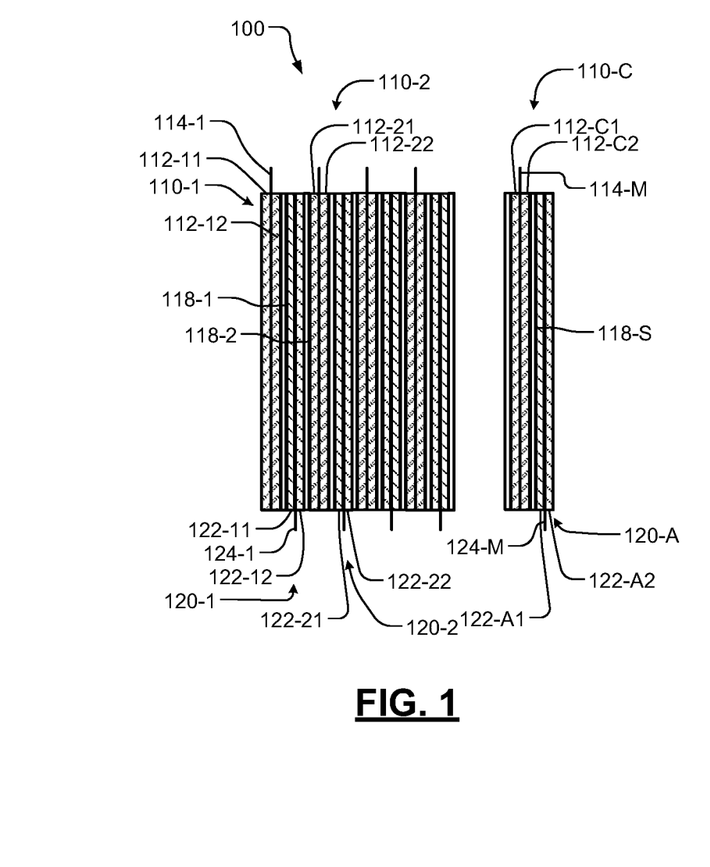
FIG. 1 is a side cross-sectional view of a battery cell including cathode electrodes and anode electrodes.

Referring now to FIG. 1, a battery cell 100 includes cathode electrodes 110-1, 110-2, . . . , and 110-C (collectively or individually cathode electrodes 110) and anode electrodes 120-1, 120-2, . . . , and 120-A (collectively or individually anode electrodes 120). In some examples, the cathode electrodes 110 and anode electrodes 120 are arranged in an alternating arrangement with separators 118-1, . . . , and 118-S (collectively or individually separators 118) arranged therebetween. In other examples such as a bipolar battery cell, a different arrangement of the cathode electrodes and anode electrodes may be used.

The cathode electrodes 110 include a cathode electrode coating 112-11, 112-12, . . . , 112-C1, and 112-C2 arranged on opposite sides of cathode current collectors 114-1, . . . , and 114-C, respectively. In some examples, the cathode electrode coating includes cathode active material, binder, solvent, and/or additives. In some examples, the cathode current collectors 114 are made of aluminum foil and have a thickness in a range from 10 to 20 µm (e.g., 16 µm).

The anode electrodes 120 include an anode electrode coating 122-11, 122-12, . . . , 122-C1, and 122-C2 arranged on opposite sides of anode collectors 124-1, . . . , and 124-C, respectively. In some examples, the anode electrode coating includes anode active material, binder, solvent, and/or additives. In some examples, the anode current collectors 124 are made of copper foil and have a thickness in a range from 7 to 10 µm (e.g., 8 or 9 µm). In FIG. 1, A, C and S are integers that are greater than one.

Figure 2:
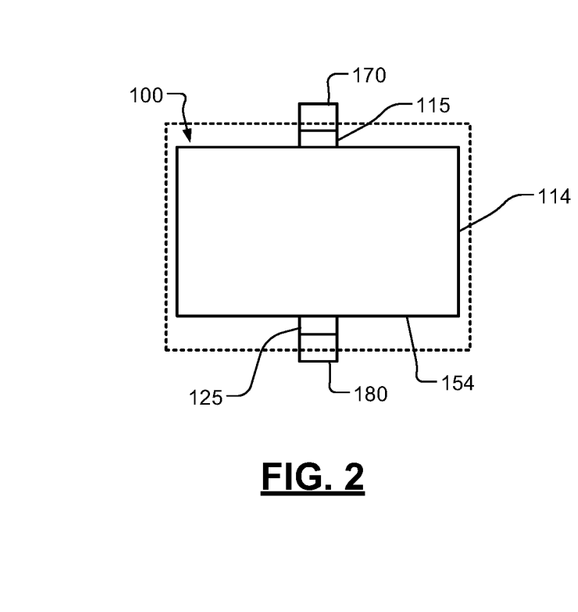
FIG. 2 is a plan view illustrating an example of a battery cell including anode and cathode lead tabs each with one welded external tab location extending from a battery enclosure.

In FIG. 2, the battery cell 100 includes a stack of the cathode electrodes 110, the anode electrodes 120 and the separators 118. The cathode electrodes 110, the anode electrodes 120, and the separators 118 are stacked in a predetermined order.

After stacking, cathode electrode tabs 115 (forming part of or connected to the cathode current collectors 114) of the cathode electrodes 110 are pre-welded together and welded to a cathode lead tab 170. Anode electrode tabs 125 (forming part of or connected to the anode current collector 124) are pre-welded and welded to an anode lead tab 180. The cathode lead tab 170 and the anode lead tab 180 extend from a pouch enclosure 184. In some examples, A and C are greater than or equal to 60. As will be described further below, welding a significant number (e.g., greater than or equal to 20, 30, . . . ) of aligned anode electrode tabs and cathode electrode tabs is challenging.

Figures 3A, 3B:
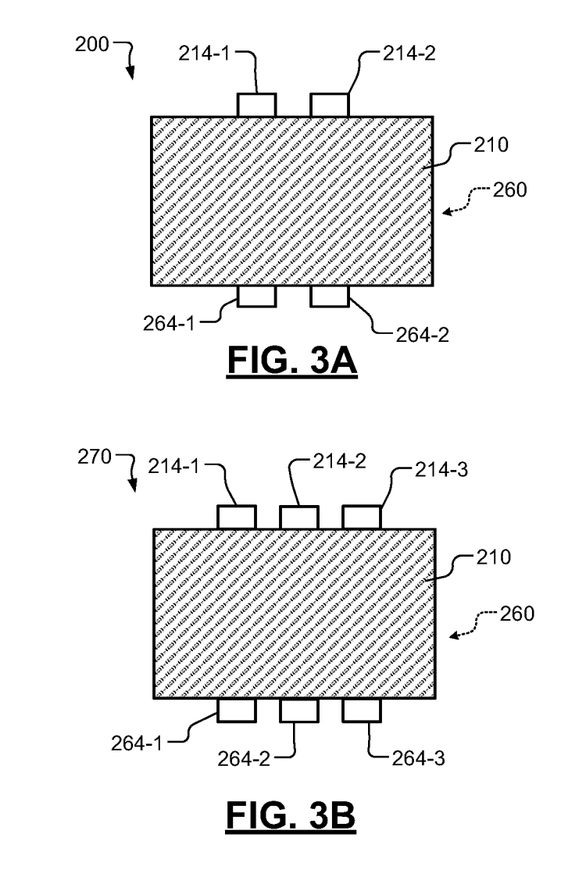
FIG. 3A illustrates an example of a stack of cathode electrodes and anode electrodes each with two asymmetric welded electrode tab locations according to the present disclosure.
FIG. 3B illustrates an example of a stack of cathode electrodes and anode electrodes each with three asymmetric welded electrode tab locations according to the present disclosure.

Referring now to FIGS. 3A and 3B, the anode electrodes and cathode electrodes include two or more asymmetric tabs to reduce the number of electrode tabs that need to be welded together. The asymmetric external tabs of the anode electrodes and cathode electrodes increase complexity of stacking since additional sequencing is required.

In FIG. 3A, cathode electrodes 210, anode electrodes 260, and separators (omitted in FIG. 3A for purposes of illustration) are arranged in a predetermined order in a stack. The cathode electrodes 210 and the anode electrodes 260 include two or more asymmetric locations for electrode tabs 214-1 and 214-2 and electrode tabs 264-1 and 264-2, respectively. The cathode electrodes 210, the anode electrodes 260, and the separators are stacked in a predetermined order and welded together to form a battery cell.

For example, C1 of the cathode electrodes 210 in the stack 200 include the electrode tabs 214-1 in one asymmetric location and C2 of the cathode electrodes 210 in the stack 200 include the electrode tab 214-2 in another asymmetric location. In other examples, first alternating ones of the cathode electrodes 210 in the stack 200 include the electrode tab 214-1 in one asymmetric location and second alternating ones of the cathode electrodes 210 in the stack 200 include the electrode tab 214-2 in another asymmetric location. A similar approach can be used for the anode electrodes 260. The asymmetric electrode tab stacks can have the same number of electrode tabs or a different number of electrode tabs.

In FIG. 3B, a stack 270 of cathode electrodes 210 and the anode electrodes 260 is shown with three asymmetric locations for electrode tabs 214-1, 214-2, and 214-3 and 264-1, 264-2, and 264-3, respectively, that are stacked (with separators) and connected to form a battery cell. For example, first ones of the cathode electrodes 210 in the stack 270 include the electrode tabs 214-1, a second ones include the electrode tabs 214-2, and third ones include the electrode tabs 214-3. In other examples, electrode tabs can cycle through the tab locations in a round robin or random manner in the cathode and/or anode electrodes. The asymmetric electrode tab stacks can have the same number of electrode tabs or a different number of electrode tabs.

Figure 4:
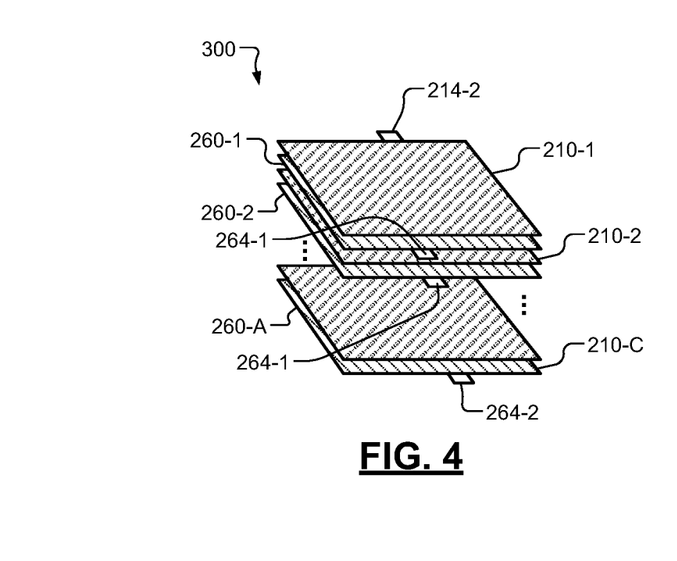
FIG. 4 illustrates an example of a stack of cathode electrodes and anode electrodes each with two asymmetric electrode tab locations according to the present disclosure.

Referring now to FIG. 4, a stack 300 of the cathode electrodes 210-1, 210-2, . . . , 210-C and the anode electrodes 260-1, 260-2, . . . , 260-A (and separators located between adjacent anode electrodes and cathode electrodes (omitted in FIG. 4 for purposes of illustration)) include asymmetric electrode tab locations and are arranged and sequenced in a predetermined order as described above.

Figure 5A:
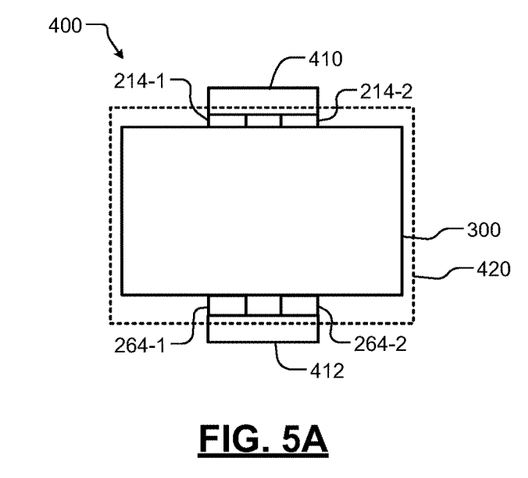
FIGS. 5A to 5C illustrate examples of a stack of cathode electrodes and anode electrodes each with two or more asymmetric electrode tab locations and anode and cathode lead tabs according to the present disclosure.
Figure 5B:
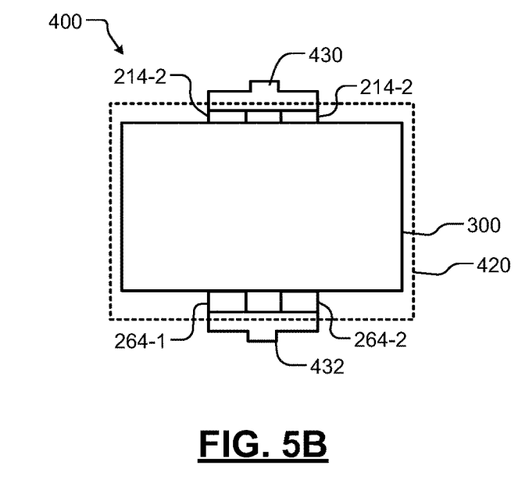
Figure 5C:
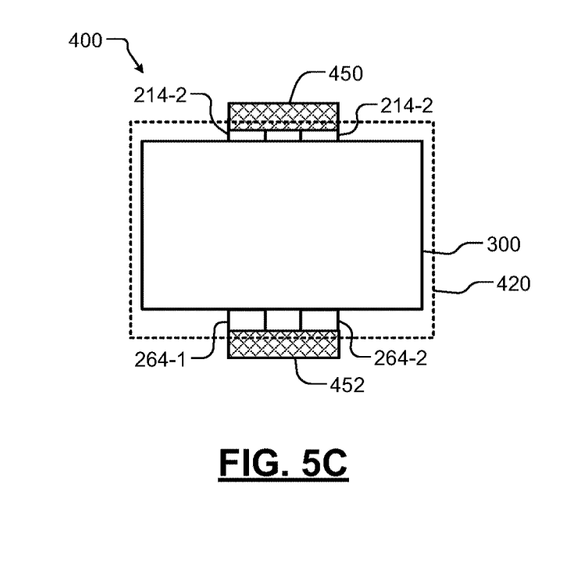

Referring now to FIGS. 5A to 5C, the asymmetric electrode tabs of the cathode and anode electrodes are connected to cathode and anode lead tabs, respectively. The lead tabs can include different materials and/or have different shapes. In some examples, the lead tabs 410 and 412 are made of the same material as the corresponding current collectors. In some examples, the anode lead tabs are made of copper and have a thickness in a range from 0.1 to 0.3 mm (e.g., 0.2 mm). In some examples, the cathode lead tabs are made of aluminum and have a thickness in a range from 0.1 to 0.5 mm (e.g., 0.2 mm or 0.4 mm).

In FIG. 5A, a battery cell 400 includes a stack of the cathode electrodes 210 and the anode electrodes 260. A lead tab 410 connects the asymmetric electrode tabs 214-1 and 214-2. A lead tab 412 connects the asymmetric electrode tabs 264-1 and 264-2. In this example, the lead tabs 410 and 412 have a rectangular shape.

In FIG. 5B, the lead tabs 410 and 412 have a "T" shape with a center leg extending away from the stack to provide additional clearance for connections to be made to the busbar. In FIG. 5C, lead tabs 450 and 452 are made of mesh such as copper mesh or aluminum mesh.

Figure 6:
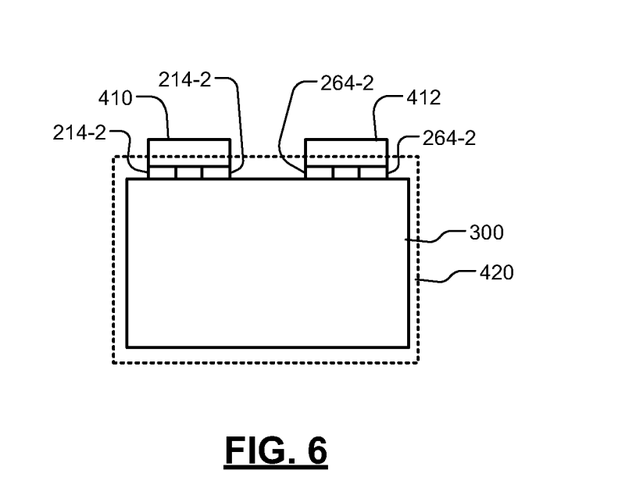
FIGS. 6 and 7 illustrate other examples of stacks of cathode electrodes and anode electrodes each with two or more asymmetric electrode tab locations and anode and cathode lead tabs according to the present disclosure.
Figure 7:
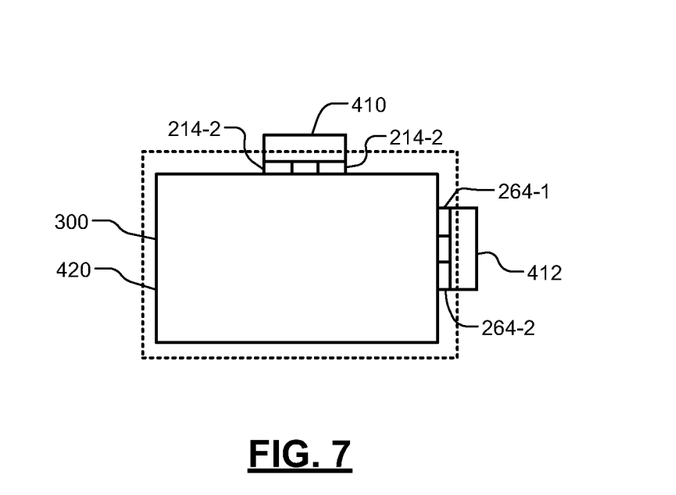

Referring now to FIGS. 6 and 7, the cathode electrode tabs 214-1 and 214-2 and the anode electrode tabs 264-1 and 264-2 are arranged in different locations. In FIG. 6, the cathode electrode tabs 214-1 and 214-2 and the anode electrode tabs 264-1 and 264-2 are arranged along the same sides of the cathode electrodes 210 and the anode electrodes 260, respectively.

In FIGS. 4 to 5C, the cathode electrode tabs 214-1 and 214-2 and the anode electrode tabs 264-1 and 264-2 are arranged on opposite sides of the cathode electrodes 210 and the anode electrodes 260. In FIG. 7, the cathode electrode tabs 214-1 and 214-2 and the anode electrode tabs 264-1 and 264-2 are arranged along adjacent sides of the cathode electrodes 210 and the anode electrodes 260.

Figure 8A:
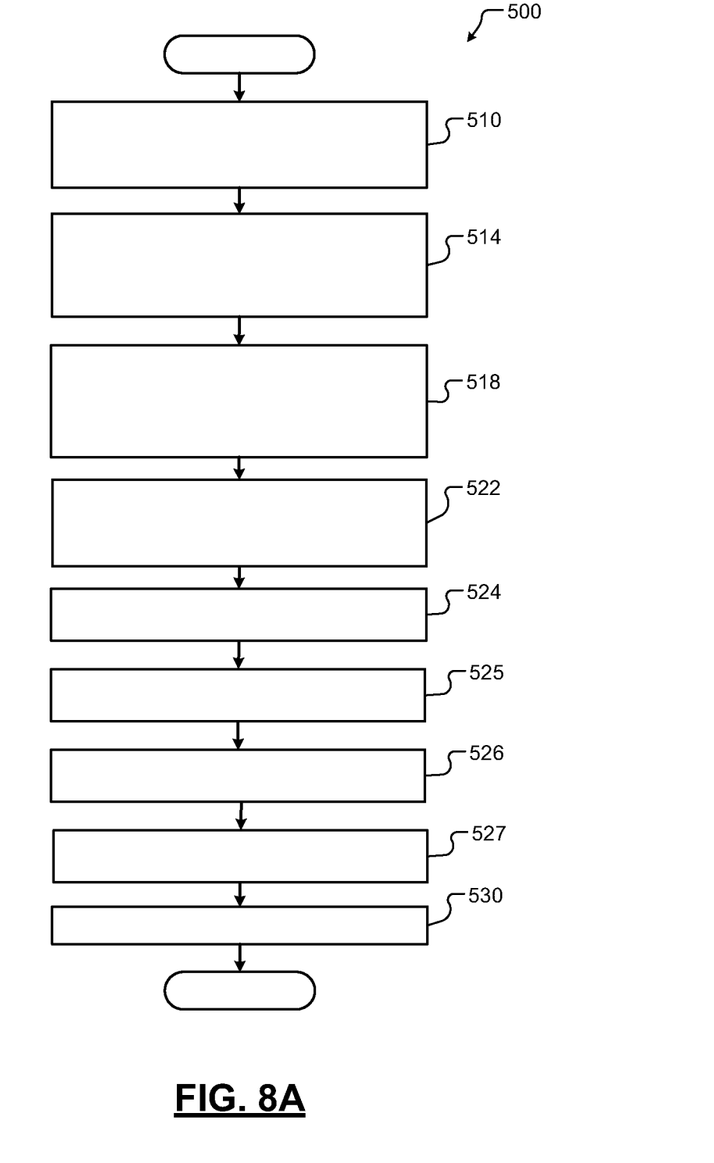
FIGS. 8A and 8B are flowcharts illustrating examples of methods for manufacturing battery cells according to the present disclosure.
Figure 8B:
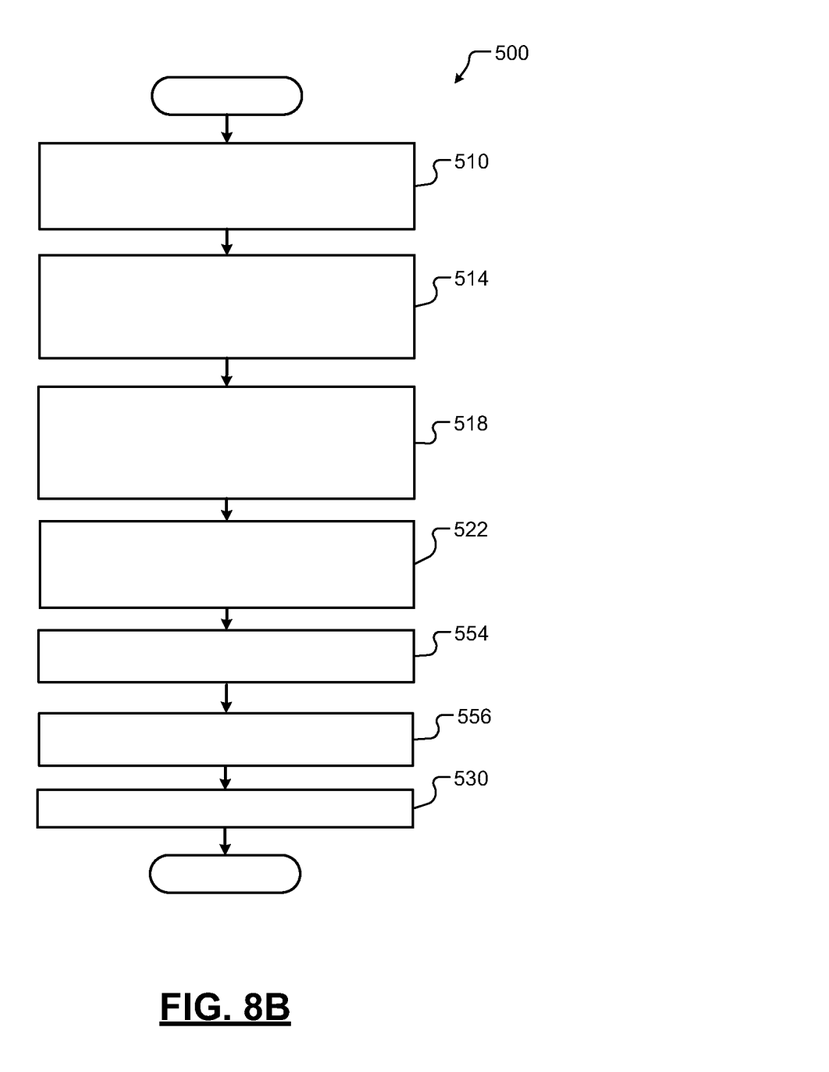

Referring now to FIGS. 8A and 8B, examples of methods for manufacturing battery cells including anode and cathode electrodes with asymmetric external tabs are shown. In FIG. 8A, a method 500 includes adding electrode coatings to one or both opposite sides of current collectors for the anode and cathode electrodes at 510. At 514, electrode tabs are cut/defined for the anode electrodes in two or more offset locations along one side surface of the anode electrodes. At 518, electrode tabs for the cathode electrodes are cut/defined in two or more offset locations along another side surface of the cathode electrodes.

At 522, the anode electrodes and the cathode electrodes with the asymmetric electrode tabs are arranged and sequenced in a predetermined order in a stack.

At 524, the cathode external tabs in the two or more asymmetric electrode tab stacks are pre-welded together (e.g., pre-welding). At 525, the cathode lead tab and the two or more asymmetric electrode tab stacks are welded together (e.g., main welding). In some examples, the pre-welding is performed using ultrasonic welding, laser welding, or another type of welding. In some examples, the main welding is performed using ultrasonic welding, laser welding, or another type of welding. In some examples, the pre-welding includes ultrasonic welding, and the main welding includes laser welding.

At 526, the anode external tabs in the two or more asymmetric electrode tab stacks are pre-welded together (e.g., pre-welding). At 527, the anode lead tab and the two or more asymmetric electrode tab stacks are welded (e.g., main welding). At 530, the battery cell is enclosed in a pouch enclosure.

The asymmetric cathode electrode tab stacks can be welded together using the same welding tool at the same time, different welding tools at different times, or the same welding tool at different times. A similar approach is used for the anode electrode tab stacks which can be welded at the same time as the cathode electrode tab stacks or sequentially.

In FIG. 8A, the asymmetric stacks of electrode tabs are pre-welded in a first step and then the lead tab and the asymmetric stacks of electrode tabs are welded in a second step. In FIG. 8B, by lowering the number of electrode tabs to be welded at the same time, the asymmetric stacks of electrode tabs and the lead tab can be welded in a single step. In some examples, the welding is performed using ultrasonic welding, laser welding, or another type of welding.

In a method 850 in FIG. 8B, after 522, the cathode lead tab and the two or more asymmetric cathode external tabs are welded together without pre-welding at 554. The anode lead tab and the two or more asymmetric anode external tabs are welded together at the same time without pre-welding at 556.

As can be appreciated, the asymmetric anode and cathode electrode tabs can be cut and assembled in a stack without buffering. Alternately, the asymmetric anode and cathode electrode tabs can be cut and buffered (or stored). As can be appreciated, the asymmetric cathode electrode tabs on the cathode electrodes can be cut and stacked in a predetermined order of use or in separate stacks corresponding to each of the asymmetric tab locations. A similar approach can be used for the anode electrodes. Then, one or more robots with vacuum handling devices can be used to select the correct electrode with the desired asymmetric tab location and assemble a stack for the battery cell in the predetermined order. As can be appreciated, the electrode tabs can be cut in two different locations of the electrodes, or the electrode tabs can be cut in one offset location and flipped to provide the second location.

For three asymmetric tabs, ⅓ of the electrode tabs can be cut in a center location and ⅔ can be cut in an offset position (and ⅓ flipped). In some examples, one or more robots with vacuum handling devices can be used to select the correct electrode with the desired asymmetric tab location, optionally flip the electrode, and assemble a stack for the battery cell. For example, a first vacuum-based handling device picks up the electrode using vacuum and passes the electrode to a second vacuum-based handling device to flip the electrode and to deliver the electrode in a flipped position to the stack. As can be appreciated, the one or more robots may include machine vision to identify the location of the external tabs to verify and/or perform flipping if needed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A battery cell comprising:
   C cathode electrodes including cathode electrode coatings arranged on C cathode current collectors;
   A anode electrodes including anode electrode coatings arranged on A anode current collectors, where A and C are integers greater than one,
   wherein the C cathode electrodes and the A anode electrodes are arranged in a predetermined order in a stack,
   wherein at least one of:
      C1 of the C cathode current collectors include first external tabs in a first asymmetric position and C2 of the C cathode current collectors include second external tabs in a second asymmetric position, where C1 and C2 are integers greater than one, and
      A1 of the A anode current collectors include first external tabs in a first asymmetric position and A2 of the A anode current collectors include second external tabs in a second asymmetric position, wherein A1 and A2 are integers greater than one,
   wherein at least one of:
      the first external tabs of the C cathode current collectors are welded together with a first weld, and the second external tabs of the C cathode current collectors are welded together with a second weld, and
      the first external tabs of the A anode current collectors are welded together with a third weld, and the second external tabs of the A anode current collectors are welded together with a fourth weld;
   a cathode lead tab welded to the first external tabs and the second external tabs of the C cathode current collectors with a fifth weld; and
   an anode lead tab welded to the first external tabs and the second external tabs of the A anode current collectors with a sixth weld.

2. The battery cell of claim 1, further comprising a pouch enclosure enclosing the C cathode electrodes and the A anode electrodes, wherein the cathode lead tab and the anode lead tab extend through the pouch enclosure.

3. The battery cell of claim 1, wherein at least one of:
   A1 is equal to A2; and
   C1 is equal to C2.

4. The battery cell of claim 1, wherein at least one of:
   A1 is not equal to A2; and C1 is not equal to C2.

5. The battery cell of claim 1, wherein at least one of the cathode lead tab and the anode lead tab have one of rectangular cross sections and "T"-shaped cross sections.

6. The battery cell of claim 1, wherein at least one of the cathode lead tab and the anode lead tab comprise mesh.

7. The battery cell of claim 1, wherein:
the first external tabs and the second external tabs of the C cathode electrodes are arranged on one side of the C cathode electrodes, and
the first external tabs and the second external tabs of the A anode electrodes are arranged on one of:
an opposite side of the A anode electrodes,
an adjacent side of the A anode electrodes, and
on a same side of the A anode electrodes as the one side of the C cathode electrodes.

8. A method for manufacturing a battery cell comprising:
providing C cathode electrodes including cathode electrode coatings arranged on C cathode current collectors;
providing A anode electrodes including anode electrode coatings arranged on A anode current collectors, where A and C are integers greater than one;
at least one of:
defining first external tabs on C1 of the C cathode current collectors in a first asymmetric position and second external tabs on C2 of the C cathode current collectors in a second asymmetric position, where C1 and C2 are integers greater than one; and
defining first external tabs on A1 of the A anode current collectors in a first asymmetric position and second external tabs on A2 of the A anode current collectors in a second asymmetric position, where A1 and A2 are integers greater than one;
arranging the C cathode electrodes and the A anode electrodes in a predetermined order in a stack;
at least one of:
welding the first external tabs of the C cathode current collectors together with a first weld and the second external tabs of the C cathode current collectors together with a second weld; and
welding the first external tabs of the A anode current collectors together with a third weld and the second external tabs of the A anode current collectors together with a fourth weld;
welding a cathode lead tab to the first external tabs and the second external tabs of the C cathode current collectors with a fifth weld; and
welding an anode lead tab to the first external tabs and the second external tabs of the A anode current collectors with a sixth weld.

9. The method of claim 8, further comprising enclosing the C cathode electrodes and the A anode electrodes in a pouch enclosure with the cathode lead tab and the anode lead tab extending through the pouch enclosure.

10. The method of claim 8, wherein at least one of:
A1 is equal to A2; and
C1 is equal to C2.

11. The method of claim 8, wherein at least one of:
A1 is not equal to A2; and
C1 is not equal to C2.

12. The method of claim 8, wherein at least one of the cathode lead tab and the anode lead tab has a cross section selected from a group consisting of a rectangular cross section and a "T"-shaped cross section.

13. The method of claim 8, wherein at least one of the cathode lead tab and the anode lead tab comprises mesh.

14. The method of claim 8, further comprising one of:
arranging and sequencing the first external tabs and the second external tabs of the C cathode electrodes on one side of the C cathode electrodes and the first external tabs and the second external tabs of the A anode electrodes on an opposite side of the A anode electrodes;
arranging and sequencing the first external tabs and the second external tabs of the C cathode electrodes on one side of the C cathode electrodes and the first external tabs and the second external tabs of the A anode electrodes on an adjacent side of the A anode electrodes; and
arranging and sequencing the first external tabs and the second external tabs of the C cathode electrodes on one side of the C cathode electrodes and the first external tabs and the second external tabs of the A anode electrodes on a same side of the A anode electrodes.

15. A battery cell comprising:
C cathode electrodes including cathode electrode coatings arranged on C cathode current collectors;
A anode electrodes including anode electrode coatings arranged on A anode current collectors, where A and C are integers greater than one,
wherein the C cathode electrodes and the A anode electrodes are arranged in a predetermined order in a stack,
wherein:
C1 of the C cathode current collectors include first external tabs in a first asymmetric position and C2 of the C cathode current collectors include second external tabs in a second asymmetric position, where C1 and C2 are integers greater than one, and
A1 of the A anode current collectors include first external tabs in a first asymmetric position and A2 of the A anode current collectors include second external tabs in a second asymmetric position, wherein A1 and A2 are integers greater than one,
wherein:
the first external tabs of the C cathode current collectors are welded together with a first weld, and the second external tabs of the C cathode current collectors are welded together with a second weld, and
the first external tabs of the A anode current collectors are welded together with a third weld, and the second external tabs of the A anode current collectors are welded together with a fourth weld;
a cathode lead tab welded to the first external tabs and the second external tabs of the C cathode current collectors with a fifth weld; and
an anode lead tab welded to the first external tabs and the second external tabs of the A anode current collectors with a sixth weld.

\* \* \* \* \*